E. ALLEN.

Revolver.

No. 1,737.

Reissued Aug. 16, 1864.

N. PETERS, PHOTO-LITHOGRAPHER, WASHINGTON, D. C.

UNITED STATES PATENT OFFICE.

ETHAN ALLEN, OF WORCESTER, MASSACHUSETTS.

IMPROVEMENT IN REVOLVING FIRE-ARMS.

Specification forming part of Letters Patent No. 21,400, dated September 7, 1858; Reissue No. 1,737, dated August 16, 1864.

DIVISION A.

*To all whom it may concern:*

Be it known that I, ETHAN ALLEN, of Worcester, in the county of Worcester and State of Massachusetts, have invented certain Improvements in Repeating Fire-Arms; and I do hereby declare that the following is a full and exact description thereof, reference being had to the accompanying drawings, and to the letters of reference marked thereon, in which drawings—

Figure 1:
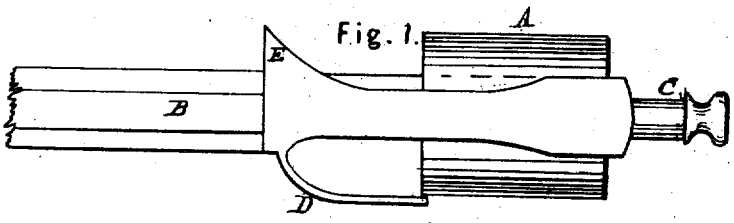
Figure 2:
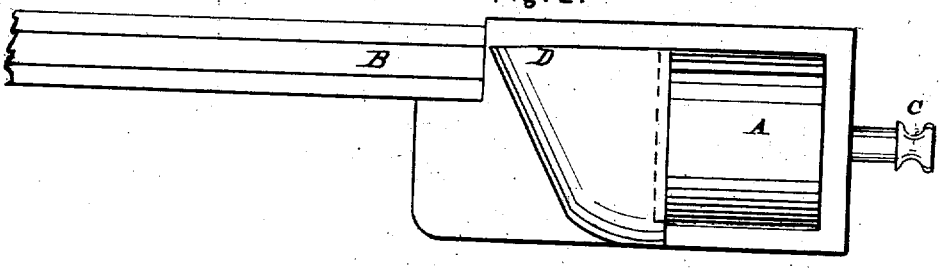
Figure 3:
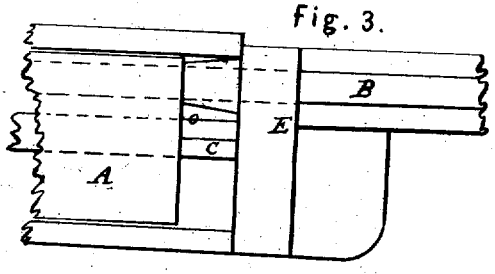
Figure 4:
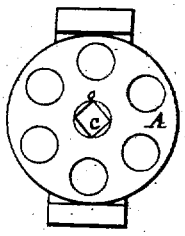

Figure 1 represents the chambered cylinder, its case, and part of the barrel. Fig. 2 is a left-hand side view of the same. Fig. 3 is a right-hand side view of the improvements. Fig. 4 shows a vertical cross-section taken through at the front end of the cylinder.

Similar letters denote the same parts in all the figures.

My improvements relate particularly to repeating fire-arms or revolvers.

In the use of arms of this description having a revolving cylinder with chambers for receiving the charges and a discharge-barrel in front a considerable quantity of the gas and fire from the discharge strikes against the edge of the bore of the discharge-barrel at the rear, and is thus thrown off laterally in all directions. The greater part of the gas or fire thus thrown off laterally is driven out from the arm, and when the arm is fired from the shoulder or otherwise with the use of both hands the hand which supports the arm is necessarily or naturally so placed in the neighborhood of the cylinder as to be exposed to such lateral discharge of gas or fire.

To remedy this difficulty is the object of my invention, which consists in providing repeating cylinder-arms to be fired by the use of both hands, with a guard or guards attached to the arm or cylinder and so formed as to deflect away from the hand which supports the arm the gas and fire which may be ejected across the front of the cylinder and the contents of any chamber which (not being at the time in the line of the barrel) may be accidentally discharged.

In the accompanying drawings a guard or projection, D, is shown starting from the left hand of the piece in front of the cylinder, curving round, and extending back some distance beyond the front end of the cylinder, forming on its inside a cavity sloping upward and forward, so as to deflect in that direction gas and fire expelled on that side and the contents of any chamber that may be accidentally discharged on that side, and thus protect the left hand and wrist of the person using the piece. On the right-hand side of the piece, where a like projection would interfere with the removal of the cylinder A when required, and where there is no necessity for directing upward the contents of any chamber that may be accidentally discharged, (on that side the wrist not being exposed,) I place for the purpose of guarding the fingers the guard or projection E in front of the cylinder, sloped outward and forward so as to guide in that direction the contents of any chamber accidentally discharged on that side.

In the foregoing description the piece is of course supposed to be used in the ordinary way, the left hand supporting it and the right hand discharging it. For use by a left-handed person the arrangements of the guard or guards would be the converse of that shown.

I do not mean to be considered as confining myself to the precise form of the guards given; but

What I claim as my invention, and desire to secure by Letters Patent, is—

The use of a guard or guards constructed and operating substantially as described, for the purpose specified.

ETHAN ALLEN.

Witnesses:
SULLIVAN FOREHAND,
GEORGE W. FAIRFIELD.